R. L. ALDRIDGE.
RELIEF VALVE FOR SPRAYING PURPOSES.
APPLICATION FILED JUNE 24, 1912.
1,055,437.
Patented Mar. 11, 1913.
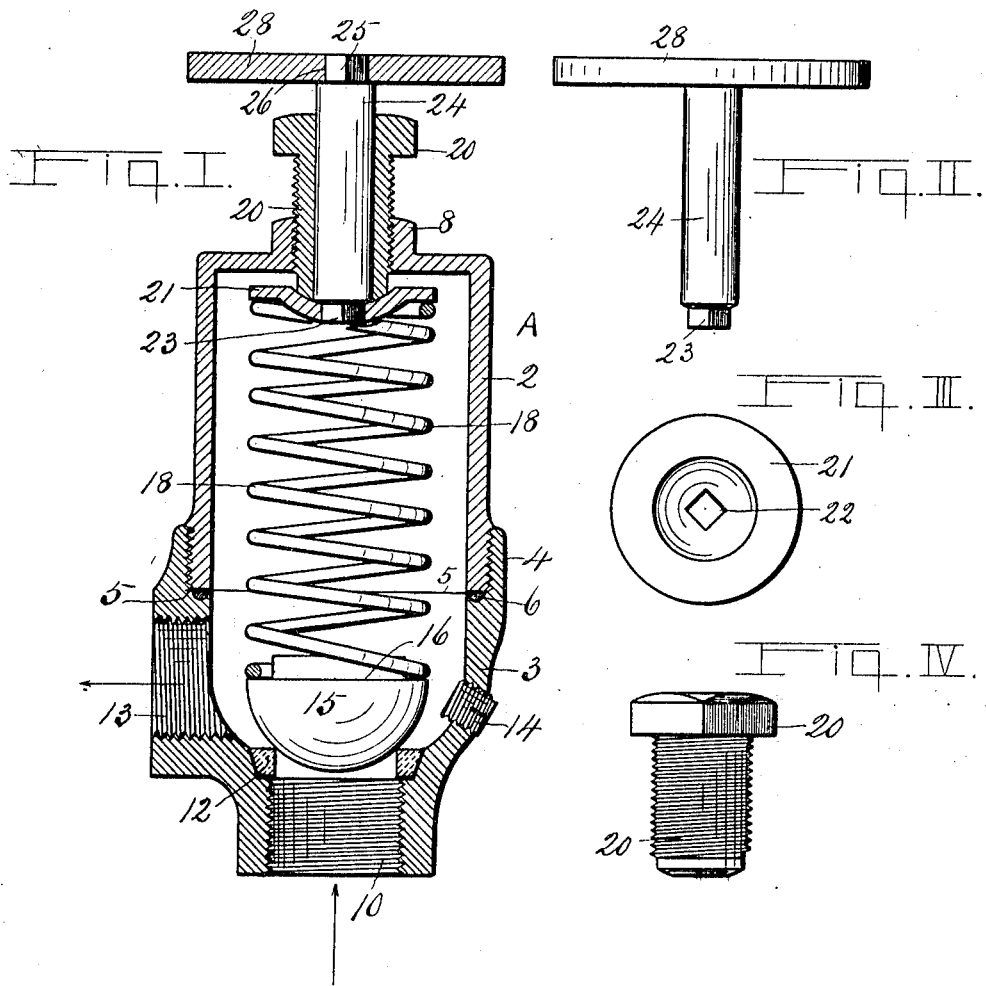

UNITED STATES PATENT OFFICE.

ROBERT L. ALDRIDGE, OF BURLINGTON, ONTARIO, CANADA.

RELIEF-VALVE FOR SPRAYING PURPOSES.

1,055,437.  Specification of Letters Patent.  Patented Mar. 11, 1913.

Application filed June 24, 1912. Serial No. 705,360.

*To all whom it may concern:*

Be it known that I, ROBERT L. ALDRIDGE, a subject of the King of Great Britain, and residing at Burlington, in the county of Halton and Province of Ontario, Canada, have invented new and useful Improvements in Relief-Valves for Spraying Purposes, of which the following is a specification.

My invention relates to improvements in relief valves specially designed and adapted for liquid spraying purposes, and consists of a casing, or shell, constructed in halves or members, screwed together, the lower member having a centrally located valve governed liquid inlet, and a liquid outlet in said casing, means for rotating the valve, and means for regulating and for the tensioning of the same.

The objects of my invention are, first, to provide a valve adapted to be utilized in connection with a force pump for spraying a liquid, composed of water, lime, sulfur and lead on trees and the like; second, to provide a valve which is positive in action, thereby relieving the pump from undue strain; third, to provide means for adjusting and regulating the valve that the same will afford various, or different degrees of pressure, say from fifty to five hundred pounds pressure per square inch, fourth, to provide means to clear the valve seating, together with the valve from any foreign and undesirable elements, that the valve may be operated in a smooth and efficient manner and held in desired place and position.

I attain these objects by the mechanism illustrated in the accompanying drawing, in which:—

Figure 1 is a sectional elevation of the valve showing the upper and the lower members of the casing, or shells, screwed together, thereby forming one casing or shell, together with mechanism therein. Fig. 2 is a detail elevation of the detached upper disk together with its rectangle shank concentric therewith. Fig. 3 is a detail plan of the detached hollow and dished shaped washer which when in position rests on the upper end part of the spiral spring, and adapted to rotate the same in opposite directions, together with the valve at the opposite and lower end part of the spring.

Fig. 4 is an elevation of the detached adjusting nut for increasing and for decreasing the pressure on the valve.

Similar characters of reference refer to similar parts throughout the several views.

In the drawing A, is the cylindrical casing, or shell, of the valve, the upper member or portion of said casing is indicated by 2, and the lower member or portion by 3. The said upper member is screwed into the upper enlarged part 4, of the member 3. An annular shoulder 5, is formed on the lower member, by the enlargement of the same, and in the shoulder is an annular groove, in which is an annular washer 6, preferably of lead, to prevent the corroding of the joint formed by the shoulder 5, of the lower member, and the lower end of the upper member.

8, is a nut on the top of the upper member and is integral and concentric therewith, and has two parallel sides suitable for the application of a wrench thereto, to screw the upper member into the lower one.

The lower end of the lower member has a threaded hole, or opening 10, concentric therewith, and which is an inlet for fluid, and a force pump is connected to said inlet by means of an ordinary and suitable pipe.

12, is a valve seating in the lower member and immediately at the top of the inlet 10, flush and rigid therewith.

13 is a threaded liquid outlet on one side of the lower member and immediately above the valve seating, and is for the connection of a pipe thereto, to be used in any convenient and approved way for spraying purposes, as set forth. In the lower member and immediately above the valve seating is a removable screwed plug 14, for draining purposes.

15 is a semispherical valve which rests loosely on the valve seating 12, and the upper part is reduced in diameter, thereby forming an annular upper part and shoulder 16. A spiral spring 18, rests on the shoulder 16 of the valve, and the reduced top part of the valve fits loosely in the spiral spring.

20 is a hollow nut, above the upper member 2, and extends in threaded form through the rigid nut 8, which is a part of said upper member, and is adapted to engage with the dished part of the dished washer or disk 21, which rests on the top of the spiral spring 18.

The nut 20 is adapted to be rotated in opposite directions and is for the purpose of increasing and of decreasing the tension and the pressure of the valve 15, on its seating.

The disk 21, has a central rectangular hole 22, into which fits the rectangle reduced end 23 of the spindle 24, which extends through the nut 8 of the upper part of the member 2, and through the pressure nut 20 and beyond. The upper end of the spindle 24 has a reduced rectangle shank 25 which fits snugly into a corresponding rectangular hole 26 in the central part of the turning disk, or hand wheel 28.

The lower end of the spiral spring 18, is on the semispherical valve 15, and the upper end part of the spring around the underside of the washer which follows the shape of, and is parallel with the upper side 21.

The wheel 28, its spindle 24, the disk or washer 21, the spiral spring 18, together with the valve 15 are adapted to rotate simultaneously together, and together in opposite directions, at pleasure, by means of the hand wheel 28. The ends of the spring 18, are attached loosely to the valve 15 and disk 21, respectively, and the friction between the ends of the spring and the disk and the valve is relied upon to effect the turning.

It will be noticed that the lower end of the nut 20 fits snugly in and follows the shape of the hollow or disk part of the washer 21, and retains the washer concentrically therewith, and is adapted to exert more or less pressure on the valve by means of the dished washer together with the spiral spring, and according to the pressure desired for spraying purposes.

The nut 20, is for the purpose of increasing and decreasing the pressure of the spiral spring on the valve, and the hand wheel 28 is for the purpose of rotating the spring together with the valve in order to clear the valve seating and the valve from any possible obstruction.

The device as set forth is operative and efficient no matter in what position the same may be placed, for instance in a reverse or horizontal position, or at any angle.

What I claim as my invention and desire to secure by Letters Patent, is:—

1. In a relief valve for spraying purposes, a casing comprising upper and lower members screwed together, the lower member having a central water inlet, an outlet and a socket having an annular groove formed therein, a lead washer in the groove, contacting with the end of the inserted upper member, a valve seating on said inlet and flush therewith, a semispherical valve on the seating, a spiral spring on the valve, a concaved disk on the opposite end of the spring, screwed means extending through the upper member and bearing on the concave portion of the disk adapted to rotate in opposite directions, thereby increasing or decreasing the tension of the valve on the seating.

2. In a relief valve for spraying, a casing comprising halves screwed together, one said half having an annular groove in the joining end thereof and a concentric liquid inlet, an outlet, and a semispherical valve in the casing, and on said inlet, a concaved disk, a spiral spring connecting the valve with the convex side of the disk, a hollow nut having a convex end screwed through the casing and adapted to loosely contact with the concave portion of the disk, and a spindle extending through the nut, and in reduced form through the disk adapted to rotate said disk in opposite directions.

3. In a relief valve for spraying, a cylindrical casing comprising two members screwed together, one of said members having an annular groove in the joining end thereof and a concentric inlet and an outlet, a semispherical valve on the inlet, a concave disk, a spiral spring loosely connecting the valve and the convex side of the disk,—a hollow nut screwed through the other of said members and extending beyond and having a convexed end to conform with the concave portion of the disk and to rotate loosely therein in opposite directions, to relieve and to bring pressure on the valve, and a spindle extending through the hollow portion of the nut and through the disk adapted to rotate the latter in opposite directions.

ROBERT L. ALDRIDGE.

Witnesses:
 JOHN H. HENDRY,
 I. H. PRATT.